June 2, 1931.  C. B. ROSS  1,807,934
LAWN MOWER SHARPENER
Filed July 9, 1928
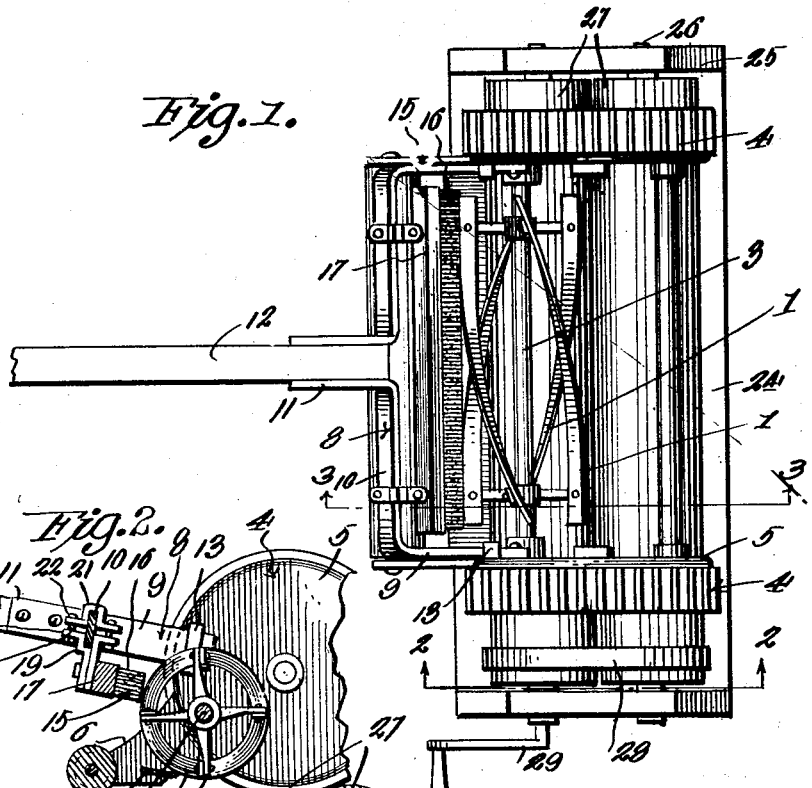
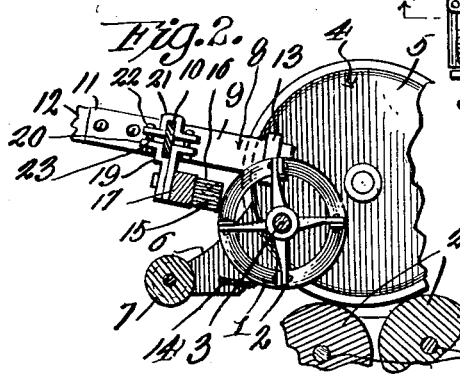
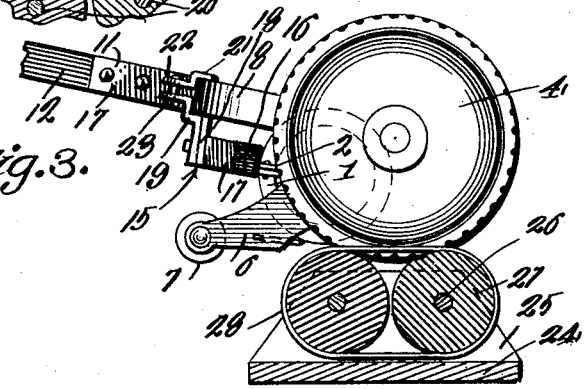
WITNESSES
INVENTOR.
CHARLES B. ROSS
BY
ATTORNEYS.

Patented June 2, 1931

1,807,934

UNITED STATES PATENT OFFICE

CHARLES B. ROSS, OF GREENLEAF, KANSAS

LAWN MOWER SHARPENER

Application filed July 9, 1928. Serial No. 291,341.

This invention relates to improvements in lawn mowers and more particularly to a novel means whereby the blades of the reel of the mower may be readily sharpened.

It is a well known fact that, where a lawn mower is frequently employed, the blades soon become dull and a frequent sharpening of the blades is required and often this constitutes a considerable item of expense. The present invention therefore has as its object to provide upon the handle yoke of a lawn mower, an abradant supplying unit which, when the handle of the lawn mower is elevated and the lawn mower is in use, will be out of contact with the cutting edges of the blades of the lawn mower reel but, when the handle of the mower is lowered, will be brought into position to be in contact with these edges so as to sharpen the same upon rotary motion being imparted to the reel, and therefore the invention also contemplates the provision of an extremely simple and very inexpensive means whereby rapid rotary motion of the reel of the lawn mower may be effected while the handle is in a lowered position to bring the abradant supplying unit into engagement with the edges of the blades. Therefore the invention contemplates a blade sharpening element which is normally not in contact with the edges of the blades, which would tend to wear away the blades due to the continual rubbing contact of their edges with the element, but which element, at the same time, will be automatically positioned to contact the cutting edges of the blades when the handle of the lawn mower is lowered.

While the accompanying drawings and the description which is to follow, constitute a disclosure of the preferred embodiment of the invention, it will be understood that various changes may be made within the scope of what is claimed.

In the accompanying drawings:

Figure 1 is a top plan view of the devices embodying the invention associated with a lawn mower;

Figure 2 is a vertical front to rear sectional view taken substantially on the line 2—2 of Figure 1 looking in the direction indicated by the arrows;

Figure 3 is a similar view on the line 3—3 of Figure 1 looking in the direction indicated by the arrows.

My invention is designed primarily for employment in connection with lawn mowers of that type in which the handle extends from a yoke the arms of which yoke are connected by clamps to the inner heads of the gear housings of the lawn mower and which yoke, together with the handle extending therefrom, may be swung upwardly to position for use in operating the lawn mower or downwardly to a lowered position when the lawn mower is not in use, the yoke being elevated with respect to the shaft upon which the blades of the reel of the mower are mounted, in the former position of the handle, and closer to the said shaft in the lowered position of the handle, and in the drawing the reel of the lawn mower is indicated by the numeral 1 and the blades thereof by the numeral 2, the reel being of the usual construction and mounted upon a shaft 3 which is driven from a gear system mounted in housings provided in the ground wheels of the mower which are indicated by the numeral 4, the inner heads of the housings being indicated by the numeral 5 and arms 6 being provided thereon extending rearwardly to support the usual ground roller 7 which rests upon the ground surface together with the ground wheels 4, while the mower is being moved over the ground surface. The numeral 8 indicates the usual handle yoke comprising the spaced side members 9 and the cross members 10 which have their relatively adjacent ends turned rearwardly at right angles as at 11 and have secured between them the lower end of the handle of the mower indicated by the numeral 12. As is customary in lawn mowers of this type, the forward ends of the side members 9 of the yoke are secured by clamps 13 to the inner heads 5 of the gear housings of the ground wheels 4. The numeral 14 indicates the usual fixed blade of the mower which extends between the bracket extensions 6 as clearly shown in the drawings.

As previously stated, the invention contemplates the mounting of an abradant supplying unit upon the yoke and in the drawings this element is indicated by the numeral 15 and comprises a brush 16 having stiff bristles which are mounted in a head 17 which may be of wood or any other material found suitable for the purpose. The brush and its head are of a length slightly greater than the reel comprising the blades 2, and, as a means for supporting the brush in such position that the ends of its bristles will be in the path of travel of the cutting edges of the blades 2, a clamp is attached to each end of the brush head 15 and comprises a member 18 which has a portion 19 to fit the lower edge of the cross pieces 10 of the yoke and terminating in outstanding ears 20. The clamp further includes a member 21 which is formed to straddle the upper edge of the respective cross piece of the yoke and having outstanding ears 22 through which and the ears 20 there are fitted bolts 23 for securing the members of the clamp upon the respective cross piece 10 of the yoke. In this manner the brush is supported in position parallel to the axis of rotation of the reel and, when the handle 12 is in the lowered position shown in Figures 2 and 3 of the drawings, the brush will be supported in a lowered position where the ends of its bristles will be presented to the cutting edges of the blades of the reel in the rotation of the reel.

In addition to the abradant supplying unit 15, the invention contemplates, as previously stated, the provision of means whereby rotary motion may be imparted to the reel of the mower at a high rate of speed for the purpose of sharpening the blades of the reel, and this device comprises a base 24 which may be of wood or any other material found suitable for the purpose and which is preferably of oblong rectangular form and provided at its ends with supporting upright portions 25 in which are rotatably journaled the ends of shafts 26 upon each of which there is mounted a cylindrical roll 27. These rolls are preferably of wood or other similar material and in order that the rolls may be connected for rotation in unison, an endless belt 28 is trained about the rolls at one end thereof. A crank handle 29 is fixed upon one end of the shaft 26 for one of the rolls and affords means whereby rotary motion may be imparted to this shaft and the roll mounted thereon and, by reason of the provision of the belt 28, rotary motion is at the same time imparted to the other roll and in the same direction. The rolls, as will be observed by reference to Figure 1, are arranged in parallelism and of a length somewhat greater than the width of the lawn mower head, so that the ground wheels 4 of the lawn mower may be disposed to rest at their lower sides upon the under sides of the rolls and, when rotary motion is imparted to the rolls through the medium of the crank handle 29, rotary motion will be transmitted to the ground wheels 4 thus rapidly revolving the reel 1 and causing the cutting edges of the blades 2 of the reel to ride over and in contact with the ends of the bristles of the brush 15. Emery powder or paste is supplied to the brush, as the case may require, and therefore the bristles of the brush, being compactly arranged and relatively stiff, will constitute an efficient abrading means for sharpening the cutting edges of the blades of the reel. It will be understood from the foregoing that when the mower is to be sharpened, the ground wheels 4 will be disposed upon the rolls 27 and the handle 12 will be permitted to assume a lowered position as shown in Figures 2 and 3 of the drawings so that the abrading supplying unit 15 will be lowered to position to serve its purpose for supplying an abrasive medium to the cutting edges of the blades of the mower reel.

Having thus described the invention, what I claim is:

As a new article of manufacture, an abradant supplying unit comprising a brush having comparatively stiff bristles, said brush comprising an elongated body, clamping means carried by said brush and adapted to straddle the upper edges of the cross pieces of a lawn mower handle yoke, bolts for securely fastening said clamps to the yoke of a lawn mower handle and adapted to support the brush in a position to be brought at the will of the operator into and out of engagement with the cutting blades of a lawn mower.

In testimony whereof I affix my signature.

CHARLES B. ROSS.